I. M. ALGUIRE.
DEMOUNTABLE WHEEL.
APPLICATION FILED AUG. 21, 1916.
1,281,890.
Patented Oct. 15, 1918.
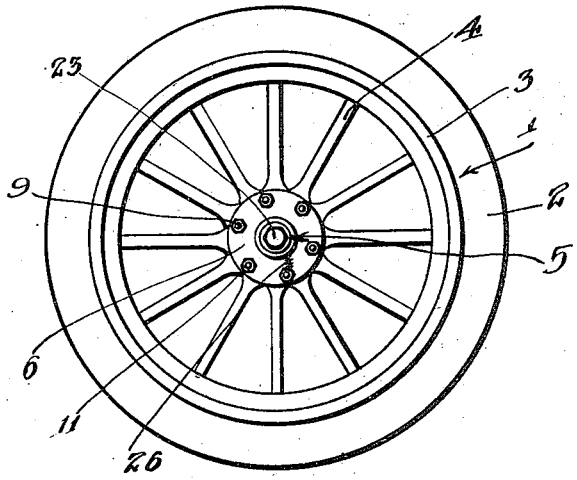
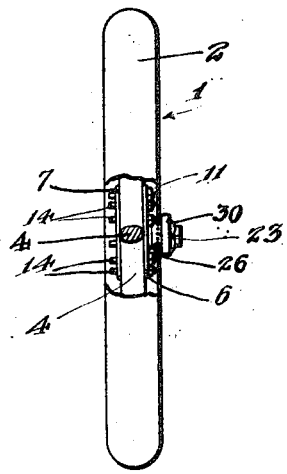
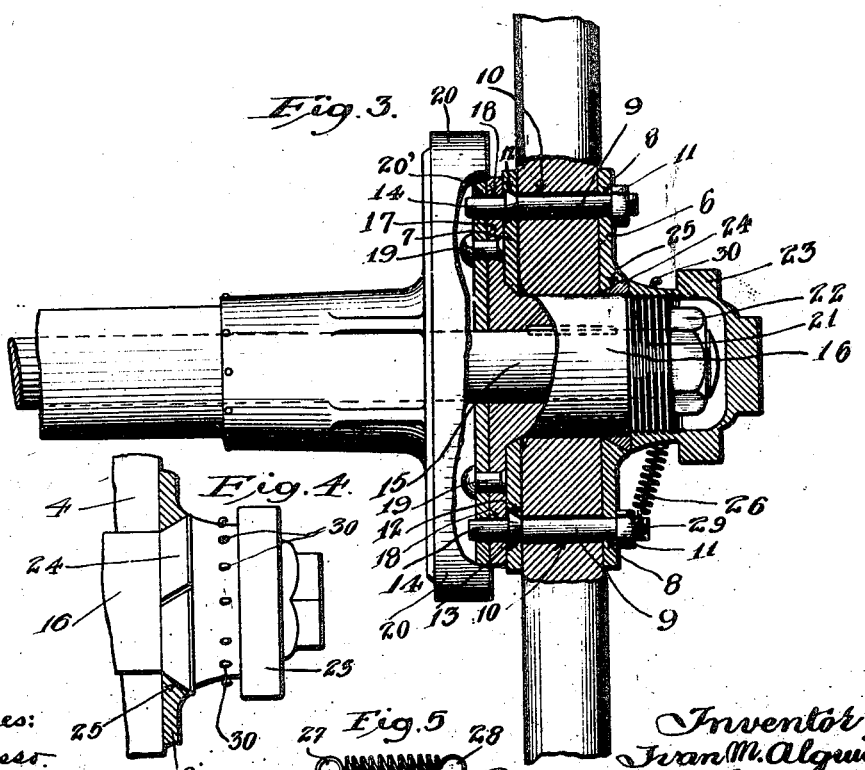
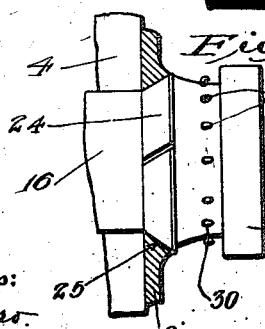

UNITED STATES PATENT OFFICE.

IVAN M. ALGUIRE, OF RIVERSIDE, CALIFORNIA.

DEMOUNTABLE WHEEL.

1,281,890.             Specification of Letters Patent.        Patented Oct. 15, 1918.

Application filed August 21, 1916. Serial No. 115,972.

*To all whom it may concern:*

Be it known that I, IVAN M. ALGUIRE, a citizen of the United States, residing at Riverside, in the county of Riverside and State of California, have invented a new and useful Demountable Wheel, of which the following is a specification.

It has not been practical to use extra wheels on certain types of automobiles, that is to remove a wheel having a punctured or blown-out tire thereon, substituting an extra wheel therefor, because the wheels, particularly the rear ones, are fastened in such manner that a great deal of time is required and much difficulty is experienced in the removal thereof. Wheels of this type have bolts extending therethrough and through a hub flange carried on the hub, the nuts on the bolt being located inside of the brake drums making it necessary to take apart the brake drums and the hub off of the axle in order to remove the nuts and bolts.

It is the primary object of this invention to provide an automobile wheel for automobiles of the type which now employ wheels of the before mentioned type, and that may be readily and easily removed or secured in position and eliminates the necessity of removing a number of nuts, bolts or other fastening elements.

A further object of this invention is to provide an automobile wheel in which it is only necessary to unscrew the hub cap in order to remove the wheel.

A further object of this invention is to provide a wheel of the character described in which there is provided means of a simple and reliable form to securely fasten the wheel upon the axle.

Referring to the drawings:

Figure 1 is a side elevation of a wheel constructed in accordance with my invention.

Fig. 2 is an end elevation of the wheel showing it broken away in part.

Fig. 3 is an enlarged detail vertical sectional view showing a fragmentary portion of the wheel.

Fig. 4 is an enlarged fragmentary vertical sectional view showing the hub cap and washer as associated with the wheel.

Fig. 5 is a side elevation of the spring to hold the hub cap in place.

Referring to the drawings, 1 designates as an entirety a wheel of the ordinary construction having a pneumatic tire 2, a rim 3 and spokes 4.

Inner and outer centrally apertured hub plates 6 and 7, each provided with a series of openings 8 near the periphery thereof, have bolts 9 inserted through said openings and through openings 10 formed in the wheel. The bolts 9 extend beyond the outer faces of the plates 6 and 7 and said plates lie in close engagement with the opposed faces of the wheel. Each bolt is screw-threaded upon its outer end and nuts 11 are turned on said outer screw-threaded ends and engage the plate 6. The openings 8 in the plate 7 are tapered inwardly as at 12 to receive beveled shoulders 13 formed upon the bolts, the outer faces of the shoulders lying flush with the outer face of the plate 7, as shown clearly in Fig. 3 of the drawings. The shoulders 13 are located in spaced relation to the inner ends of the bolts and this arrangement provides projections 14.

The rear axle as shown in Fig. 3 of the drawings, includes the axle proper 15 which is provided with a hub 16 keyed thereon and having integral with its inner end a plate or flange 17 somewhat similar to the plate 7. The plate 17 is provided with openings 18 through which the projections 14 extend and is riveted as at 19 to the brake drum 20. The brake drum 20 is provided with openings 20' therein to receive the projections 14, said openings being already formed in the drum for the purpose of receiving the bolts such as heretofore used in wheels of this type to hold the wheels in place. The axle 15 extends beyond the outer end of the hub 16, is screw-threaded and has turned thereon a nut 22. An internally screw-threaded hub cap 23 is turned upon the hub 16 and abuts a beveled split spring metal washer 24. The washer 24 engages the beveled face 25 of the opening through the plate 6 and upon the tightening of the hub cap 23 provides for a wedging action which results in the secure holding of the wheel upon the axle.

To prevent the hub cap from working loose incident to jars and vibrations, there is provided a retractile spring 26 having an eye 27 at one end and a loop or hook 28 at the other end. One of the bolts 9 is longer than the other and is provided in its outer end with an aperture 29 to receive the eye 27, whereas the hub cap 23 carries a plurality of projections 30 upon its periphery and for coöperation with the loop or hook 28.

The assembled wheel prior to its being secured upon the axle comprises the plates 6 and 7 and bolts 9 holding the plates in position. The axle supports the hub 16, the flange 17 is rigid with the hub and the brake drum 20 is riveted to the flange 17. To secure the wheel, it is placed upon the hub 16 so that the projections will extend through the openings 18 and 20' in the flange 17 and drum 20 respectively. When the projections are so fitted, the plate 7 lies in close engagement with the flange or plate 17. The washer 24 is next placed upon the hub 16 so that its beveled face engages the beveled face 25 of the opening through the plate 6 and the hub cap 23 is next screwed into place and into engagement with the outer side of the washer 24. The spring 26 is attached as heretofore described after the hub cap has been screwed into place and holds the hub cap against negative rotation.

It will be seen that the bolts 9 and nuts 11 also the hub 16 and nut 22 need not be removed in order to remove the wheel from the axle. The only change in the construction of the axle elements of the type of automobile with which my wheel is adapted to be used is that the flange on the hub is riveted to the brake drum, whereas in the present style of construction the bolts for securing the wheel extend through the flange and brake drum and are held in position by nuts.

While I have shown the application of my wheel to the rear axle of an automobile, it is to be understood that the wheel may be used in connection with a front axle, that is to say, a single wheel carried as an extra wheel may be substituted for any one of the four wheels of the automobile. In the front axle construction, the hub includes a flange such as the one 17 for the rear axle, said hub being held secured rotatably upon the front axle in the customary manner and in this event the projections 14 on the wheel extend through the openings in the front wheel hub flange. It is not thought necessary to illustrate this construction as it is well-known and partially illustrated in Fig. 3 of the drawings.

With reference to the foregoing description and accompanying drawings it will be observed that I have provided a simple, reliable and durable demountable wheel which may be put on or removed from an axle with ease and in a comparatively short time, and it is to be understood that various minor changes in detail, size and proportion of parts may be resorted to when required without sacrificing the spirit of invention and the scope of the subjoined claim.

I claim:

In a demountable wheel the combination with an axle having a hub secured thereto having a flange formed with openings therein, of a brake drum rigidly secured to the flange, of a demountable wheel having plates secured upon opposite sides of the hub portion thereof, said plates having openings therethrough, bolts extending through said plates and the hub portion of the wheel, said bolts having nuts turned on their outer ends and engaged with the plate on the outer face of the wheel, said bolts projecting beyond the inner plate on the wheel and extending into the openings in the flange, shoulders on the bolts countersunk in the inner plate of the wheel, a washer mounted upon the hub and engaging the outer plate on the wheel, a hub cap mounted upon the hub and engaging said washer, and a retractile spring secured to one of said bolts and to the hub cap to hold the latter against negative rotation.

Signed at Riverside, California, this 12th day of August 1916.

IVAN M. ALGUIRE.

Witnesses:
ZELLA V. ALGUIRE,
M. ALGUIRE.